United States Patent Office 3,435,840
Patented Apr. 1, 1969

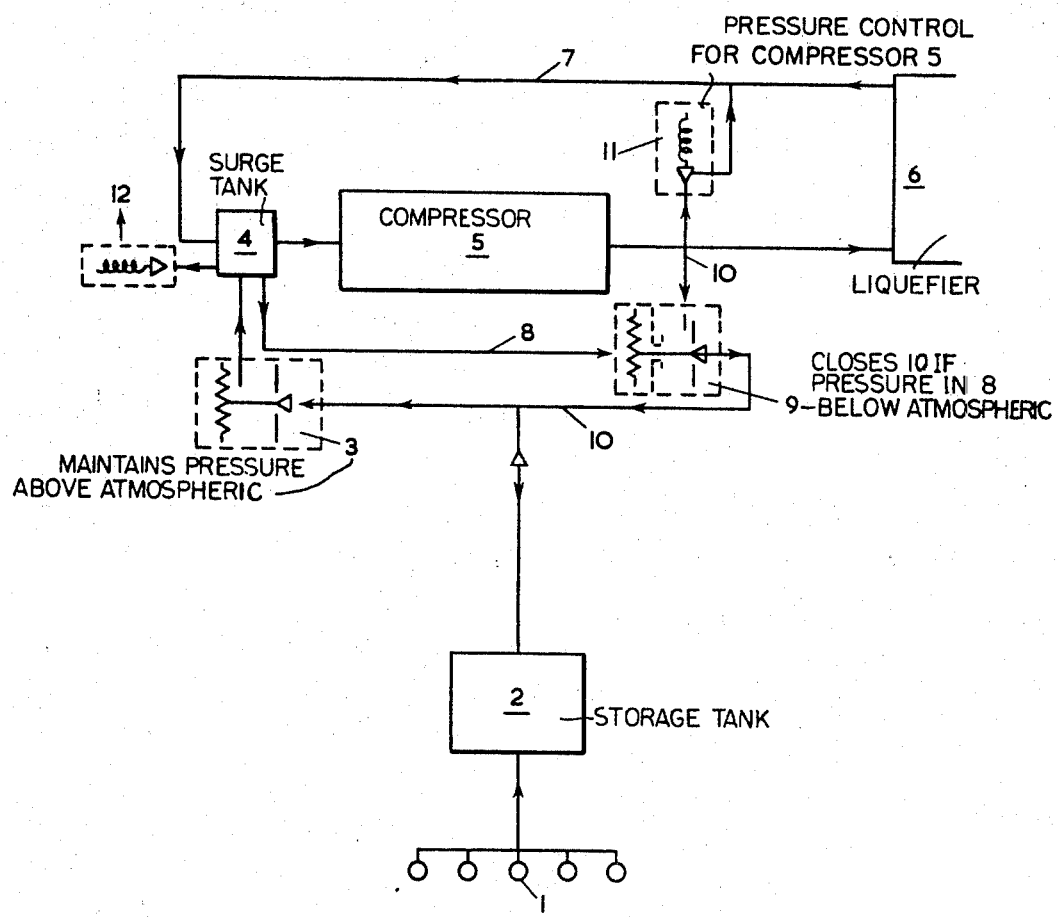

3,435,840
PRESSURE CONTROL ARRANGEMENT
Michael E. Clarke, Kingston, England, assignor to The British Oxygen Company Limited, a British company
Filed Oct. 10, 1966, Ser. No. 585,687
Claims priority, application Great Britain, Oct. 14, 1965, 43,592/65
Int. Cl. G05d 16/00
U.S. Cl. 137—110  3 Claims

ABSTRACT OF THE DISCLOSURE

A pressure control arrangement for a gas compression system in which gas is fed from a gas storage vessel through a pressure surge vessel to a gas compressor. The arrangement comprises a first pressure controller to allow gas into the surge vessel only when the gas pressure therein is below a preselected value, and a second pressure controller operable to return gas from the compressor outlet to the gas storage vessel when the pressure in the surge vessel rises above said preselected value. A third pressure controller may be provided to return gas from the compressor outlet to the surge vessel when the compressor outlet pressure is too high.

---

The present invention relates to a pressure control arrangement for a gas compression system. This pressure control arrangement is particularly suitable for, but not confined to, compression systems in low temperature liquefiers and refrigerators using helium, neon or hydrogen.

In the operation of a liquefier, gas is passed from a storage vessel to the inlet of a gas compressor at approximately atmospheric pressure. The compressed gas is then passed to a liquefying stage where part of the gas is liquefied, and the unliquefied fraction is fed back to the compressor input.

In order to keep the compressor working efficiently it is essential that the gas pressure at the compressor inlet shall be held substantially constant irrespective of the volume of gas passing through the compression system.

One way of maintaining this constant pressure is to insert a gas holder in the gas flow path between the storage vessel and the compressor. This gas holder has a comparatively large volume and acts as a gas reservoir which is substantially unaffected by local changes in gas pressure. Gas holders of this type have previously taken the form of a plastic gas bag, a liquid sealed gas holder or a dry gas holder containing a flexible membrane. It has been found however that gas bags tend to be clumsy, and that they almost invariably leak. The liquid sealed gas holders introduce contaminants into the gas, whereas the dry gas holders are expensive, and gas may diffuse through the flexible membrane.

It is an object of the present invention to provide a pressure control arrangement in which the above mentioned disadvantages are at least partially overcome.

According to the present invention there is provided a pressure control arrangement for a gas compression system comprising a pressure surge vessel located in the gas path from a gas storage vessel to a gas compressor, a first pressure controller operable to allow gas into the pressure surge vessel only when the gas pressure therein falls below a preselected value, and a second pressure controller operable in response to the pressure in the pressure surge vessel to allow gas to return to the gas storage vessel from the compressor outlet when the gas pressure in the pressure surge vessel rises above said preselected value.

The pressure surge vessel is simply a metal container of a suitable size to smooth out any variations in gas pressure caused by the reciprocating action of the compressor.

The invention may further comprise a third pressure controller operable in response to the gas pressure at the compressor outlet to allow gas to return from the compressor outlet to the pressure surge vessel when the compressor outlet pressure is above a desired value.

The desired gas pressures at the compressor input and outlet will depend on the operational characteristics of the compressor and the properties of the gas to be liquefied. One particular example is the liquefying of helium in which the compressor input and output pressures are maintained at approximately atmospheric pressure and 200 p.s.i. respectively.

The first and second pressure controllers may be combined into a single unit. The controllers themselves are known pieces of apparatus, and they may for example each consist essentially of a needle valve operated by the gas pressure acting on a diaphragm.

The invention will be particularly described with reference to the accompanying block schematic drawing which illustrates a helium liquefaction plant.

Referring to the drawing, helium is delivered from a group of cylinders 1 to a gas storage tank 2 where it is stored at a pressure in the range 10–15 p.s.i. The helium is fed from the storage tank 2 through a first pressure controller 3 and pressure surge tank 4 into a compressor 5 at substantially atmospheric pressure. The compressor compresses the helium to approximately 200 p.s.i. and feeds the helium into a liquefier 6 where part of the helium is liquefied, the unliquefied fraction being fed back along a pipeline 7 to the surge tank 4.

The first pressure controller 3 closes when the gas pressure in the surge tank 4 is above atmospheric, and opens when the pressure in the tank 4 falls below atmospheric. In this way the controller 3 controls the gas flow into the tank 4 so as to maintain the pressure in the tank 4 near to atmospheric, but the controller 3 cannot prevent the pressure of the gas already in the tank from rising. This may occur, for instance, during the warming up period of the liquefier.

The tank 4 is connected by a pipeline 8 to a second controller 9 located in a pipeline 10 which passes from the compressor output to the storage tank 2. The controller 9 is designed to close the pipeline 10 if the pressure in the pipeline 8 falls below atmospheric. If, however, the pressure in the pipeline 8 rises above atmospheric then this gas pressure operates the controller 9 to open the pipeline 10 allowing gas to return from the compressor outlet back to the storage tank 2. The feedback arrangement ensures that the pressure in the tank 4 and the compressor inlet, remains at approximately atmospheric.

A third pressure controller 11 is connected between the compressor outlet and pipeline 7 which runs from the liquefier 6 back to the tank 4. This third controller 11 is controlled by the compressor outlet pressure so that if this outlet pressure rises above a preselected value the controller 11 opens to allow gas to return from the compressor outlet to the tank 4 until the pressure build-up has subsided.

A safety valve 12 is connected to the tank 4 to allow gas to escape to the atmosphere if the gas pressure in the tank 4 should become excessive due to a mishap.

When the plant is shut down the gas in the system, together with gas produced by evaporation of any liquid in the system, is pumped back into the cylinders 1. This is preferably carried out by operating the compressor 5 to pump the gas through a by pass line not shown. If, however, the cylinder storage pressure is above the operational limit of the compressor 5 a separate compressor may be used.

I claim:
1. A pressure control arrangement for a gas compression system comprising a gas storage vessel, a gas compressor, a pressure surge vessel located in the gas path from the gas storage vessel to the gas compressor, a first pressure controller operable to allow gas into the pressure surge vessel only when the gas pressure therein falls below a preselected value, and a second pressure controller operable in response to the pressure in the pressure surge vessel to allow gas to return to the gas storage vessel from the compressor outlet when the gas pressure in the pressure surge vessel rises above said preselected value.

2. A pressure control arrangement for a gas compression system comprising a gas storage vessel, a gas compressor, a pressure surge vessel located in the gas path from the gas storage vessel to the gas compressor, a first pressure controller operable to allow gas into the pressure surge vessel only when the gas pressure therein falls below a preselected value, a second pressure controller operable in response to the pressure in the pressure surge vessel to allow gas to return to the gas storage vessel from the compressor outlet when the gas pressure in the pressure surge vessel rises above said preselected value, and a third pressure controller operable in response to the gas pressure at the compressor outlet to allow gas to return from the compressor outlet to the pressure surge vessel when the compressor outlet pressure is above a desired value.

3. A pressure control arrangement according to claim 1 in which during shut down periods the gas in the system and the gas produced by evaporation of any liquefied gas in the system is pumped into a reservoir outside the system so that the pressure inside the system does not rise appreciably above atmospheric pressure.

References Cited

UNITED STATES PATENTS

| | | | |
|---|---|---|---|
| 2,226,810 | 12/1940 | Ensign et al. | 137—110 X |
| 3,213,875 | 10/1965 | Spence | 137—110 |

NATHAN L. MINTZ, *Primary Examiner.*